United States Patent [19]

Tajima et al.

[11] Patent Number: 5,708,859
[45] Date of Patent: Jan. 13, 1998

[54] WATER DROP REMOVING APPARATUS FOR CAMERA LENS ASSEMBLY

[75] Inventors: Fujio Tajima, Omiya; Hiroshi Hatazawa, Sapporo, both of Japan

[73] Assignee: Nippon Hoso Kyokai, Tokyo, Japan

[21] Appl. No.: 802,574

[22] Filed: Feb. 19, 1997

[30] Foreign Application Priority Data

Feb. 27, 1996 [JP] Japan .................................. 8-067106
Jun. 28, 1996 [JP] Japan .................................. 8-188354

[51] Int. Cl.$^6$ ................................................ G03B 17/08
[52] U.S. Cl. ........................ 396/25; 396/544; 359/507
[58] Field of Search ................................ 396/25–29, 429, 396/534, 544; 348/61, 81, 82, 83, 84, 85; 352/131, 132; 359/507, 508–515

[56] References Cited

U.S. PATENT DOCUMENTS

| | | | |
|---|---|---|---|
| 4,355,861 | 10/1982 | Sebald ........................... | 359/512 |
| 4,497,550 | 2/1985 | Ouchi et al. ..................... | 359/509 |
| 5,096,287 | 3/1992 | Kakinami et al. ................ | 352/132 |
| 5,315,333 | 5/1994 | Nash ............................... | 396/25 X |
| 5,394,208 | 2/1995 | Campbell ........................ | 396/25 X |

*Primary Examiner*—Howard B. Blankenship
*Attorney, Agent, or Firm*—Ronald R. Snider

[57] ABSTRACT

The water drop removing apparatus for a camera lens assembly is arranged to automatically wipe off water drops or the like attached on the front face of the lens assembly to make field shooting in rainy or snowy weather easy. Injection nozzles consisting of a soft tube in the number of three, for example, are disposed on the top edge and each side edge in such a manner that they are mounted to be rocked around a rocking shaft by a motor or an air rocking mechanism. Each of the injection nozzles are connected with an electromagnetic valve, an air pump, or the like. The three injection valves are rocked fanwise in an order to inject air onto the face of the shooting window through the injection nozzles during the forward period of this rocking. The nozzles on each side is rocked from top to bottom. This causes the water drops attached on the front face of the shooting window to be automatically removed, so that there is no need to wipe off water drops with cloth or the like. In addition, the injection nozzles may be automatically operated at rainfall by using a rainfall sensor.

8 Claims, 5 Drawing Sheets

WATER DROP REMOVING APPARATUS FOR CAMERA LENS ASSEMBLY

BACKGROUND OF THE INVENTION

This application claims the priority of Japanese Patent Application No. 8-67106, filed on Feb. 27, 1996 and No. 8-188354, filed on Jun. 28, 1996 which are incorporated herein by reference.

1. Field of the Invention

The present invention relates to an apparatus for removing water drops from a camera lens assembly, and, more particularly, an arrangement of a water drop removing apparatus for a lens assembly which can be used when a television camera or industrial camera is used outdoor.

2. Description of the Prior Art

Conventionally, in bad weather for field broadcasting, a lens hood with visor or the like is used for rain or snow. However, it is difficult to completely prevent rain or snow during shooting.

That is, since the visor of the lens hood narrows the field of view, the visor is limited for the length which can be projected forward. In addition, it is difficult to prevent rain or snow from attaching to the front face of the lens because the camera is sometimes directed upward in field shooting. Therefore, when water drops attach because of rain or snow, it is necessary to wipe window (shooting window) glass of the lens hood with cloth or the like. Thus, at present, the situation is accommodated by preparing a plurality of TV cameras (spare cameras, or the like), which is inconvenient.

The present invention is invented in view of the above, and intended to provide an apparatus for removing water drops or the like from a camera lens assembly in which water drops or the like attached on the front face of a lens assembly are automatically wiped off, so that field shooting can be easily attained in rainy or snowy weather.

SUMMARY OF THE INVENTION

To attain the above object, the water drop removing apparatus for a camera lens assembly according to the present invention comprises an injection nozzle arranged for injecting air in a direction along the front face of the camera lens assembly, air supply means for supplying air to the injection nozzle, and rock driving means for rocking the injection nozzle around a rocking shaft so that injected air is spread over a wide range of the front face of the camera lens assembly. The rock driving means may use, for example, a motor driven forward and backward. In addition, the front face of the. lens assembly may include the front face of the window glass of the lens hood, or the front face of the lens of the lens assembly itself.

With such arrangement, compressed air is supplied to the injection nozzle consisting of, for example, a thin pipe from an air pump through a closing valve, the injection valve vigorously injecting air along the front face of the lens assembly. At the same time, since the injection nozzle rocks around the rocking shaft, air is injected in a fan shape over the front face of the lens assembly. Accordingly, the water drops attached on the front face of the lens assembly is automatically removed by the air injection, whereby. there is an advantage that there is no need to wipe the front face of the lens.assembly with cloth or the like.

In addition, a plurality of the injection nozzles are arranged around the outer periphery of the camera lens assembly, and liked to rock in a predetermined order. The injection nozzles arranged on each side (including a case where they are arranged on only either one side) may be driven to rock from top to bottom.

With such invention, the injection nozzles injecting air while rocking of three, for example, are positioned on the top and side edges of the lens assembly. These injection nozzles are rocked in a predetermined order, those on each side being rocked from top to bottom to inject air. Therefore, in this case, efficiency for wiping off water drops from the front face of the lens assembly is improved. In addition, air injected from the injection nozzles may be performed in either only one direction or in both directions.

In addition, as the rock driving means, there may be provided an air rocking mechanism rocked by supply of air, to which air is supplied for control to rock the injection nozzles.

With such arrangement, when air from the air supply means is supplied to the air rocking mechanism at predetermined timing, the air rocking mechanism rocks the injection nozzle with the pressure of air, whereby there is provided an advantage that the air supply means for supplying air to the injection nozzle can also perform rock driving at the same time without using a driving motor.

Furthermore, there is provided a rainfall sensor on the camera lens assembly, so that the air supply means and the injection nozzle can be automatically driven with the output of the rainfall sensor. With such arrangement, when a raindrop is detected by the rainfall sensor, supply of air and rocking of the injection nozzle are started and controlled so that the Wipe-off operation is automatically performed.

Figure 3A:
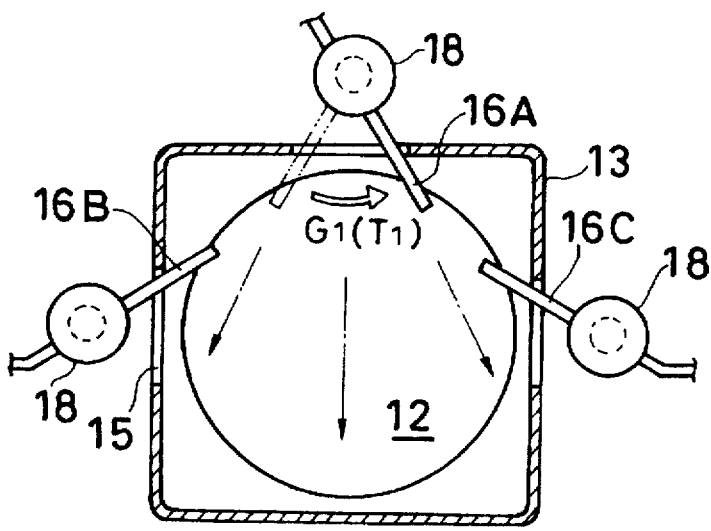
Figure 3B:
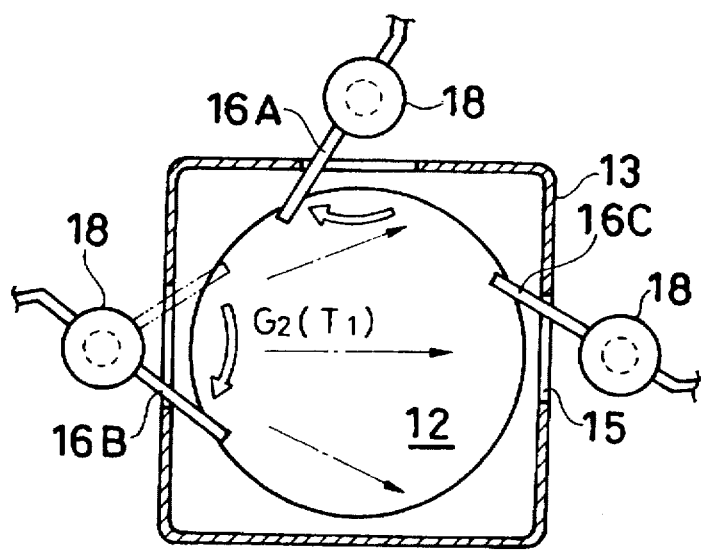
Figure 3C:
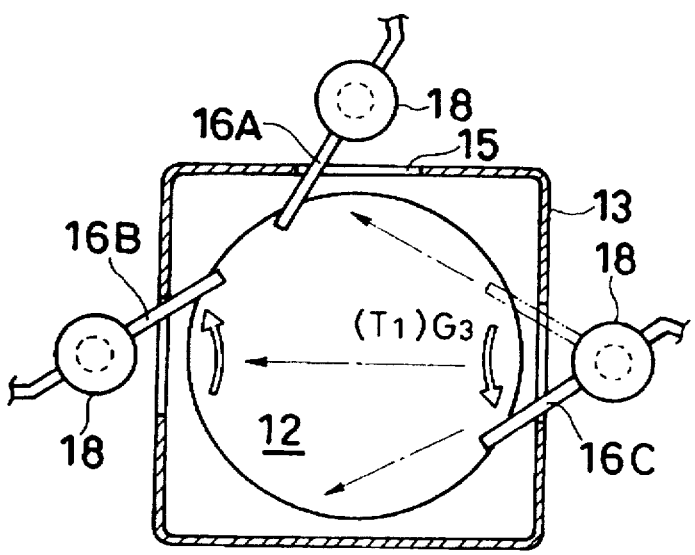
Figure 4:
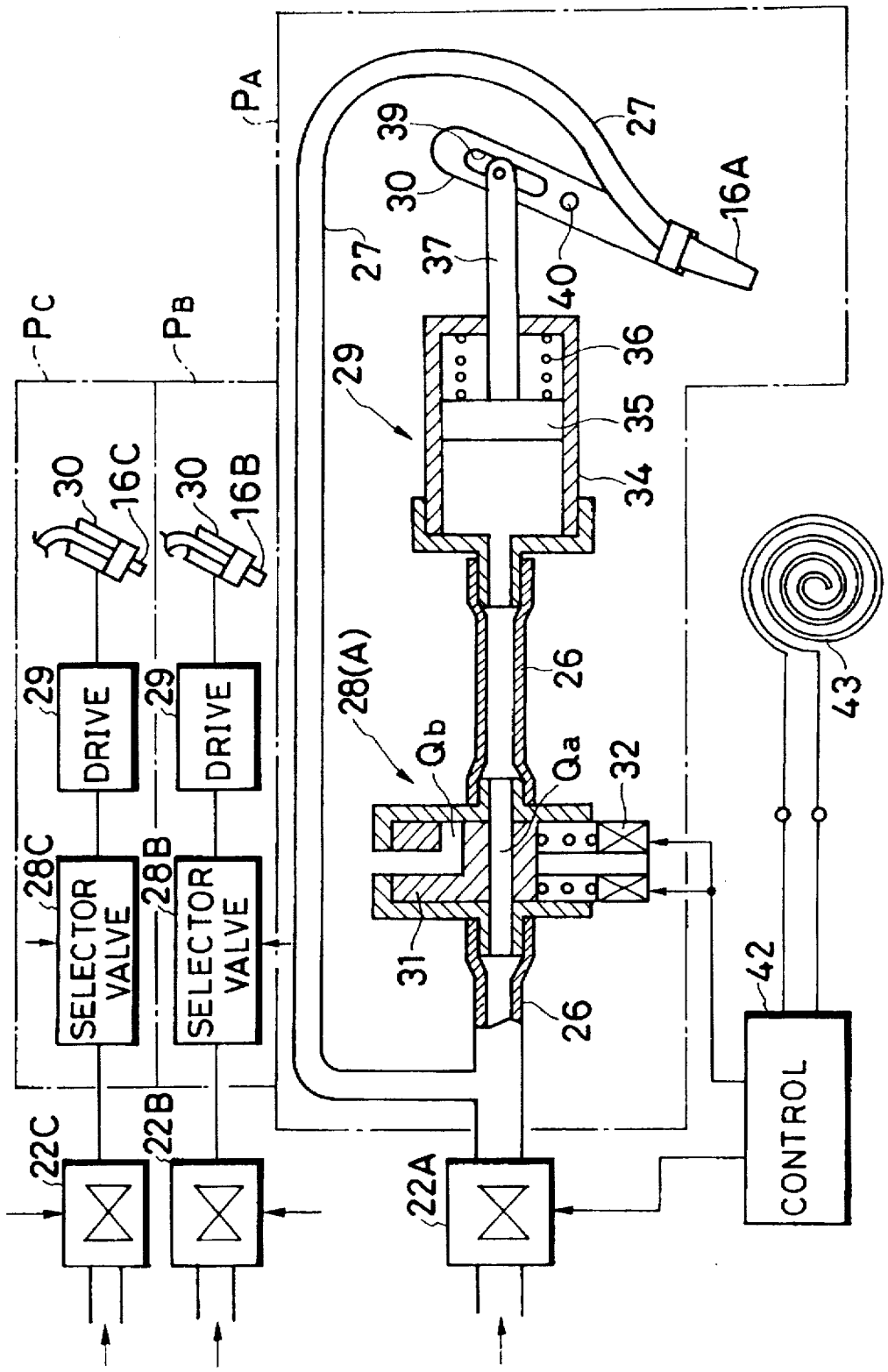
Figure 5:
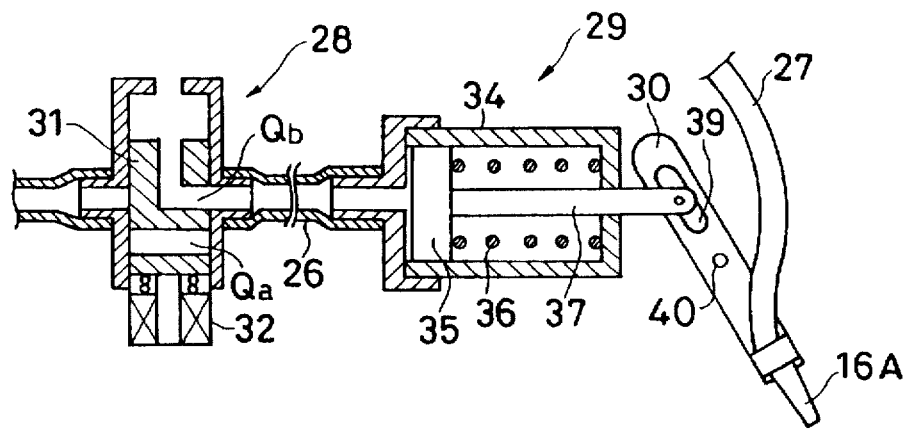
Figure 6A:
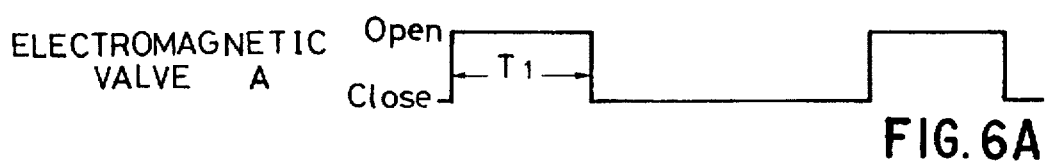
Figure 6B:
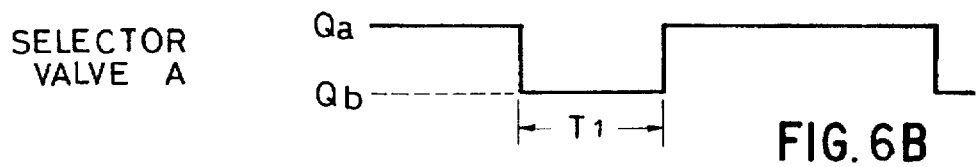
Figure 6C:
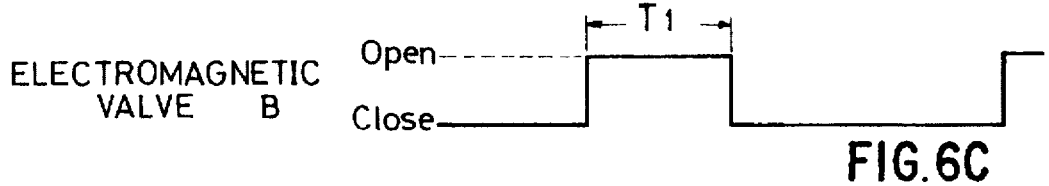
Figure 6D:
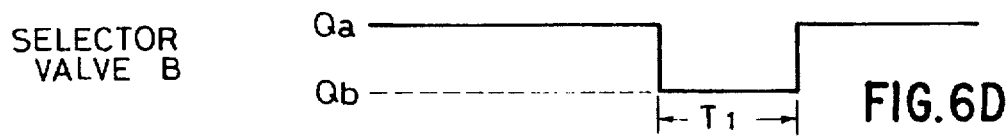
Figure 6E:
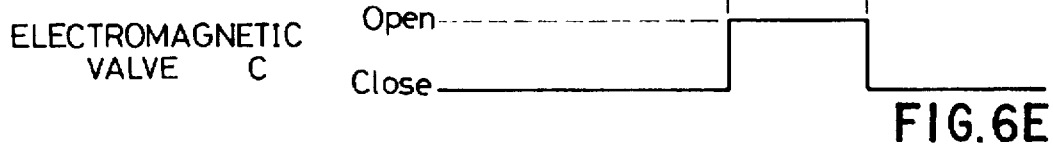
Figure 6F:
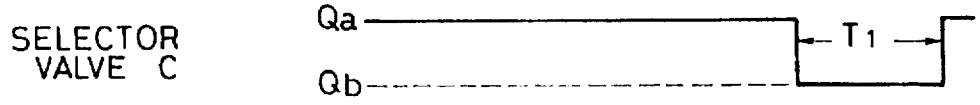

FIG.. 3A is the operation when the top nozzle of the water drop removing apparatus of the first embodiment is operated;

FIG. 3B is the operation when the left nozzle of the water drop removing apparatus of the first embodiment is operated;

FIG. 3C is the operation when the right nozzle of the water drop removing apparatus of the first embodiment is operated;

FIG. 4 is the arrangement of a water drop removing apparatus according to a second embodiment of the present invention;

FIG. 5 is the operating state of an air rocking mechanism of the second embodiment; and FIG. 6 is a waveform illustrating the operation of the apparatus according to the second embodiment.

DETAILED DESCRIPTION OF THE PREFERRED EMBODIMENTS

First Embodiment

Figure 1:
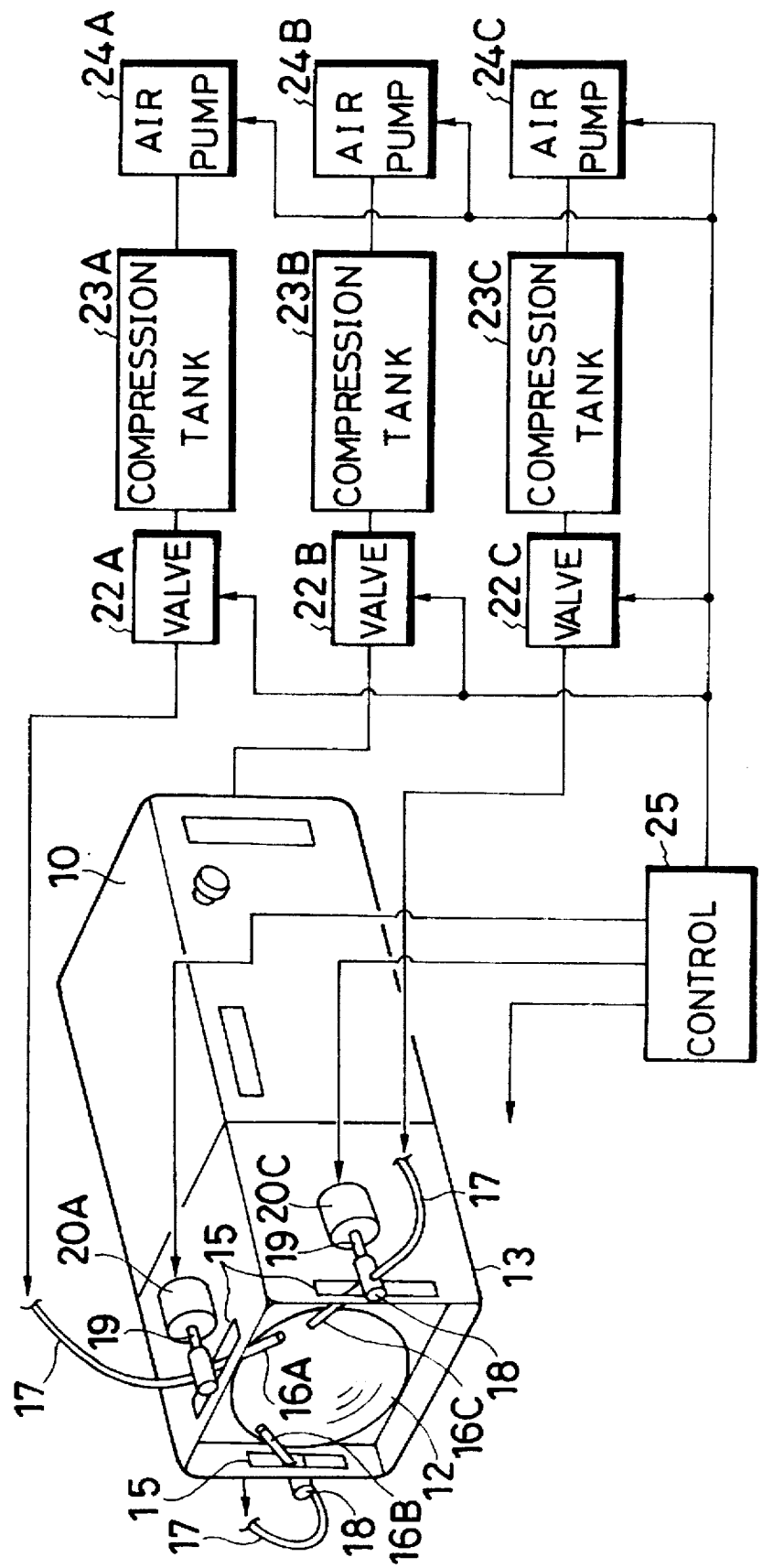
FIG. 1 is the arrangement of a water drop removing apparatus for a camera lens assembly (TV camera) according to a first embodiment of the present invention.
Figure 2:
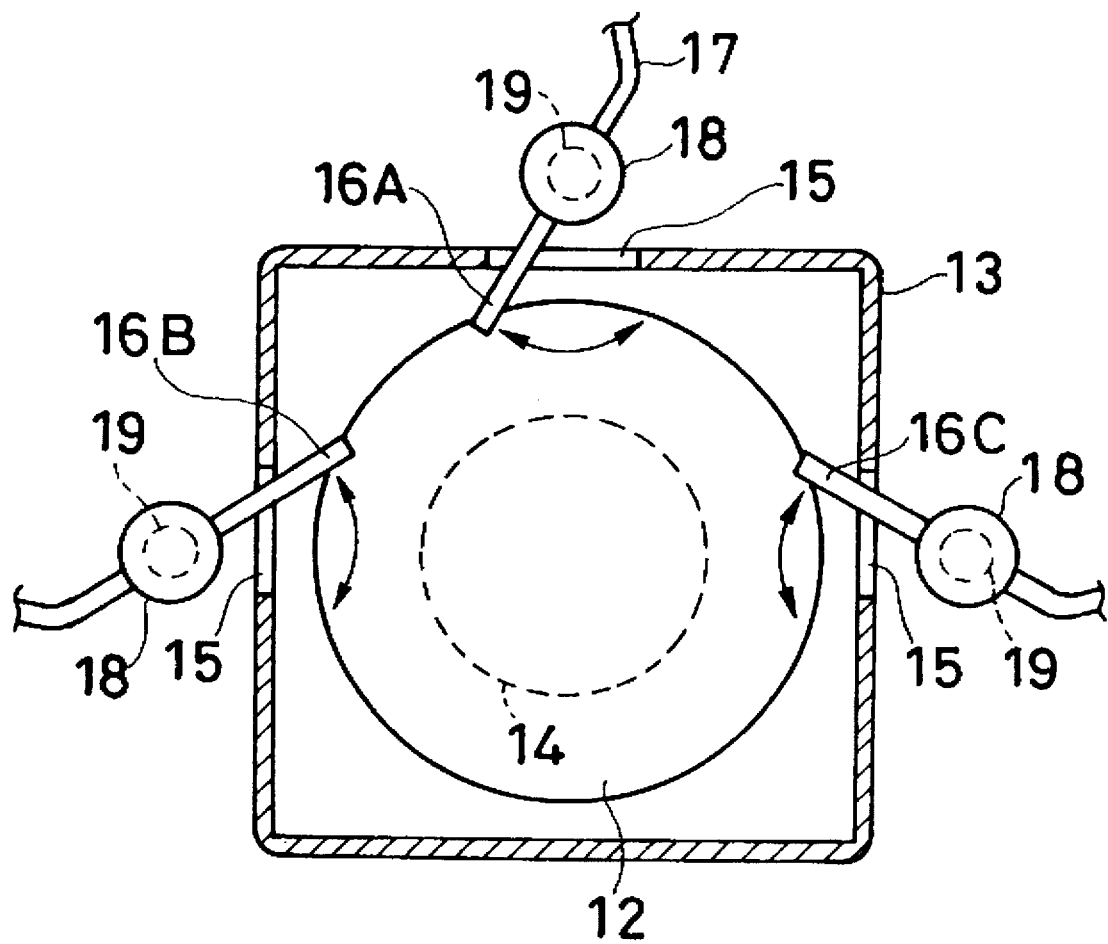
FIG. 2 is a front view showing the front of the TV camera of FIG. 1, in a state where it is cut at the hole for a lens hood.

FIGS. 1 and 2 show a water drop removing apparatus according to a first embodiment of the present invention. In the figures, a lens hood 13 with a shooting window 12 is mounted on the front of a TV camera 10. A lens assembly 14 (FIG. 2) Of the TV camera 10 is displaced within the lens hood 13. Slit shaped openings 15 are formed in the top and side edges of the lens hood 13. Injection nozzles 16A, 16B and 16C are positioned through the openings 15.

That is, the injection nozzles 16A, 16B and 16C are the front ends of supply tubes 17 consisting of soft tubes, or separate, slightly thinner rigid tubes, and held by cylindrical holding members 18. The holding members 18 are supported on motors 20A, 20B (not shown) and 20C through rocking shafts (motor shafts) 19. The motors 20A, 20B and 20C are arranged to rotate in forward and backward directions by a predetermined amount. The motors 20A, 20B and 20C or the rocking shafts 19 are fixed on the outer periphery of the lens hood 13 with fixing means (not shown). In this case, the injection nozzles 16A, 16B and 16C are directed toward the shooting window 12 through the openings 15, and located to be horizontal with respect to the window surface (or, to be slightly inclined toward the surface).

In addition, the injection nozzles 16A, 16B and 16C are connected to electromagnetic valves (closing valves) 22A, 22B and 22C through the supply tubes 17. The electromagnetic valves 22A, 22B and 22C are provided with compression tanks 23A, 23B and 23C to which air pumps 24A, 24B and 24C are connected. Moreover, a control 25 is provided to drive control these components and the motors 20A, 20B and 20C.

The control 25 drives the motors 20A, 20B and 20C for rocking the injection nozzles 16A, 16B' and 16C in an order while the air pumps 24A, 24B and 24C are operated. For example, the control is arranged to be performed in such a manner that, when the injection nozzle 16A moves to the ultimate end of the forward rocking direction (it may be when a predetermined period of time expires after the movement), the next injection nozzle 16B starts to move, and, when this injection nozzle 16B moves to the ultimate end of the forward rocking direction, the last injection nozzle 16C starts to move.

Then, the electromagnetic valves 22A, 22B and 22C are controlled to be similarly opened in the order of A, B and C for a duration T1 when the injection nozzles 16A, 16B and 16C moves the forward rocking direction, respectively. Therefore, in this embodiment, air is injected only when the injection nozzle 16 is on the forward path, and not injected when it moves on the backward path. The injection nozzle 16A placed on the top of the lens hood 13 may be arranged to inject air on both the forward and backward paths.

The first embodiment has the above arrangement, and its operation is explained with reference to FIG. 3. When the control 25 of FIG. 1 receives a start Operation signal from a water drop removing push button or the like, it operates the air pumps 24A, 24B and 24C to supply air to the compression tanks 23A, 23B and 23C, whereby air is compressed to a predetermined pressure value in these compression tanks 23A, 23B and 23C. Subsequently, the control 25 drives the motor 20A, and opens the electromagnetic valve 22A for a predetermined period of time T1. Then, as shown in FIG. 3 (A), the upper injection nozzle 16A moves fanwise along the forward path G1 in the counterclockwise direction in the figure, and injects compressed air in the compression tank 23A from its top end, whereby the water drops are pushed downward.

Then, at the time when the injection nozzle 16A of FIG. 3 (A) moves to the ultimate end of the forward path G1, the control 25 closes the electromagnetic valve 22A, opens the electromagnetic valve 22B, and starts driving of the motor 20B at the same time. Then, as shown in FIG. 3 (B), the injection nozzle 16B at the left in the figure moves fanwise along the forward path G2 in the clockwise direction in the figure, and injects compressed air from its top end, whereby the water drops are pushed to the right. Here, the injection nozzle 16A moves to the original position along the backward path as the motor 20A rotates reverse.

Then, similarly, at the time when the injection nozzle 16B of FIG. 3 (B) moves to the ultimate end of the forward path G2, the control 25 closes the electromagnetic valve 22B, opens the electromagnetic valve 22C, and starts driving of the motor 20C at the same time. Then, as shown in FIG. 3 (C), the injection nozzle 16C at the right in the figure moves fanwise along the forward path G3 in the counterclockwise direction in the figure, and injects compressed air from its top end, whereby the water drops are pushed to the left. Here, the injection nozzle 16B moves to the original position along the backward path as the motor 20B rotates reverse.

Subsequently, the operation would transfer to that of FIG. 3 (A), and the injection nozzle 16C returns to its original position during the operation of FIG. 3 (A). Thus, air can be injected onto the shooting window 12 from the injection nozzles 16A, 16B and 16C in the order by repeating the operations of FIGS. 3 (A)–(C). According to the linked operation by the injecting directions, there is provided an advantage that water drops can be efficiently removed. That is, water drops can be efficiently pushed downward or downward with inclination by injecting air from top to bottom with the upper injection nozzle 16A, and by moving the left and right injection nozzles 16A and 16B from top to bottom and driving them in the order of the left nozzle 16B and the right nozzle 16C. When the upper nozzle 16A is moved right to left (clockwise), it is sufficient to move the nozzles in the order of the right nozzle 16C and the left nozzle 16B.

Second Embodiment

FIGS. 4 through 6 show the arrangement of a second embodiment. The second embodiment drives the injection nozzles 16 with supplied air which are arranged similar .to FIG. 1. As shown in FIG. 4, in the second embodiment, drives PA, PB and PC using an air rocking mechanism are provided for the electromagnetic valves 22A, 22B and 22C, respectively. In the drives PA, PB and PC, as shown by the detail of drive PA, a tube 26 constituting a drive line passage and a supply tube 27 branched to the injection nozzle 16A from the tube 26 are connected to the air exit side of the electromagnetic valve 22A. Disposed at the drive line passage (tube 26) side are a selector valve (electromagnetic valve) 28, a piston drive 29, and a drive lever 30.

That is, the selector valve 28 moves a movable section 31 formed with two connections Qa and Qb with a solenoid drive 32 vertically in the figure, .thereby selecting one of the connections Qa and Qb to be connected to the tube 26 of the drive line passage. As shown in the figure, when the connection Qa is connected to the drive line.passage, air is supplied from the electromagnetic valve 22A to the piston drive 29. On the other hand, when the connection Qb is connected, the drive line passage is turned to a state in which it is opened to the open air.

In addition, the piston drive 29 consists of a cylinder 34, a piston 35, and a return spring 36 urging the piston 35 toward the air inlet side. A connecting rod 37 of the piston 35 is connected to an elongated groove 39 in the drive lever 30. The drive lever 30 is arranged to be rocked around a shaft 40, and the nozzle 16A is connected to the top end of it.

With such piston drive 29, as in.FIG. 4, when air is supplied by the setting of connection Qa of the selector valve 28, the piston 35 moves right in the figure against the urging force of the return spring 36. When air in the cylinder 34 is released into the open air by the setting of the connection Qb of the selector valve 28, the piston 35 is moved left by the return spring 36 in the figure. This reciprocation of the piston 35 rocks the drive lever 30.

In addition, there is provided a control 42 for controlling the electromagnetic valves 22A, 22B and 22C and the solenoid drive 32. Moreover, in the second embodiment, a raindrop sensing sensor 43 for automatically sensing raindrops as a rainfall sensor is disposed on the top surface or the like of the lens hood (13 in FIG. 1). That is, as shown in the figure, this raindrop sensing sensor 43 is arranged to cause minute current to flow through a spirally wound conductor line, and to detect short-circuiting of the conductor line by raindrops, thereby detecting rainfall.

The second.embodiment is arranged as above. In the second embodiment, when the raindrop sensing sensor 43 detects rainfall (snowfall), as shown in FIGS. 6 (A), (C) and (E), the electromagnetic valves 22A, 22B and 22C are opened in an order only for a duration T1, based on the control of the control 42. At the moment, the selector valves 28 (A, B and C) are connected with the connection Qa as shown in FIG. 4, and air supplied from the electromagnetic valves 22A, 22B and 22C flows into the cylinder 34 of the piston drive 29 through the tube 26 to move the pistons 35 in the drives PA, PB and PC to the right in the figure.

After the duration T1 expires, when the electromagnetic valves 22A, 22B and 22C are closed in an order, as shown in FIGS. 6 (B), (D) and (F), the selector valve 28 is changed over to the connection Qb. This state is maintained for the duration T1. At the moment, air in the cylinder 34 can flow into the open air, and the piston 35 is moved to the left by the return spring 36 as shown in FIG. 5.

Such reciprocation of the piston 35 in the piston drive 29 causes the drive lever 30 to rock, and the injection nozzles 16A, 16B and 16C attached to the drive lever 30 are rocked in an order every duration T1 (rocking duration 2 T1). Accordingly, air injected from the rocking injection nozzles 16A, 16B and 16C performs the operation f6r wiping off raindrops from the shooting window 12. The injection nozzles 16A, 16B and 16C may be operated in the direction similar to the first embodiment.

Then, when the raindrop sensor 43 detects not to be a rainfall condition, the control 42 stops the supply of air and the operation of the drives PA, PB and PC. The wiping operation may be stopped by a switch or the like.

In the above embodiments, although the injection nozzles 16B and 16C are mounted on each side of the lens assembly, it may be arranged to provide either one of them.

In addition, although the above embodiments are arranged to inject air onto the shooting window 12 of the lens hood 13, it may be arranged not to usethe lens hood 13, but to directly inject air onto the front face of the lens assembly (objective lens) by utilizing an attachment directly mounted on the TV lens assembly, and providing the injection nozzles and rock driving means.

Furthermore, the water drop removing apparatus of the present invention may be applied to various cameras including permanent cameras such as a weather camera and industrial hand-held cameras in addition to a field shooting camera.

As described above, according to the present invention, since the injection nozzles are mounted on the front of the camera lens assembly to inject air while rocking such injection nozzles around a rocking shaft, water drops or the like attached on the front face of the lens assembly can be automatically wiped off, whereby shooting can be performed with one camera in any weather including rain or snow.

In addition, there is an advantage that the efficiency for removing water drops can be improved by rocking a plurality of injection nozzles mounted on the outer periphery of the lens assembly in a predetermined order, and from top to bottom rocking the injection nozzles mounted on each side.

When an air rocking mechanism rocked by air supply is provided as the rock driving means, there is an advantage that rock driving can be simultaneously performed by the air supply means without using a drive motor or the like.

In addition, when a rainfall sensor is provided on the camera lens assembly, and supply of air and rocking of the injection nozzle are started based on the output of the rainfall sensor, it becomes possible to automatically perform the wiping operation with air.

What is claimed is:

1. A water drop removing apparatus for a camera lens assembly comprising:
    an injection nozzle for injecting air along the front face of the camera lens assembly;
    air supply means for supplying air to said injection nozzle; and
    rock driving means for rocking said injection nozzle around a rocking shaft, and causing injected air to spread over a wide extent of the front face of said camera lens assembly.

2. The water drop removing apparatus for a camera lens assembly as set forth in claim 1, wherein an air pump, a compression tank and an electromagnetic valve are displaced as said air supply means.

3. The water drop removing apparatus for a camera lens assembly as set forth in claim 1, wherein a motor driven in forward and reverse directions is used as the rock driving means.

4. The water drop removing apparatus for a camera lens assembly as set forth in claim 1, wherein a plurality of said injection nozzles are disposed on the outer periphery of said camera lens assembly, these injection nozzles being interlocked to rock in a predetermined order, the injection nozzles disposed on each side being driven to rock from top to bottom.

5. The water drop removing apparatus for a camera lens assembly as set forth in claim 1, said injection nozzle is controlled to inject air in only either one of forward and backward paths of rocking.

6. The water drop removing apparatus for a camera lens assembly as set forth in claim 1, wherein said injection nozzle is controlled to inject air in both forward and backward paths of rocking.

7. The water drop removing apparatus for a camera lens assembly as set forth in claim 1, wherein an air rocking mechanism rocked by a supply of air is provided as said rock driving means, air from said air supply means being supplied and controlled for said air rocking mechanism to rock said injection nozzle.

8. The water drop removing apparatus for a camera lens assembly as set forth in claim 1, wherein a rainfall sensor is provided on said camera lens assembly, said air supply means and said injection nozzle being automatically driven based on the output of said rainfall sensor.

* * * * *